United States Patent [19]

Shigematsu et al.

[11] Patent Number: 5,077,814
[45] Date of Patent: Dec. 31, 1991

[54] OPTICAL TRANSMISSION LINE FOR USE IN AN OPTICAL COMMUNICATION SYSTEM

[75] Inventors: Masayuki Shigematsu; Masumi Fukuma, both of Yokohama, Japan

[73] Assignee: Sumitomo Electric Industries, Ltd., Osaka, Japan

[21] Appl. No.: 419,641

[22] Filed: Oct. 11, 1989

[30] Foreign Application Priority Data

Oct. 31, 1988 [JP] Japan ................................. 63-273209

[51] Int. Cl.⁵ ................................................ G02B 6/28
[52] U.S. Cl. .......................................... 385/24; 385/28; 385/46; 359/173
[58] Field of Search ........................... 350/96.15, 96.16; 455/600, 605, 606, 612

[56] References Cited

U.S. PATENT DOCUMENTS

| | | | |
|---|---|---|---|
| 4,400,054 | 8/1983 | Biard et al. | 350/96.15 |
| 4,449,783 | 5/1984 | Witte | 350/96.16 |
| 4,676,594 | 6/1987 | Presby | 350/96.15 X |
| 4,768,854 | 9/1988 | Campbell et al. | 350/96.16 |
| 4,838,636 | 6/1989 | Mannschke | 350/96.16 |

Primary Examiner—John D. Lee
Assistant Examiner—John Ngo
Attorney, Agent, or Firm—Cushman, Darby & Cushman

[57] ABSTRACT

A mode scrambler is interconnected between a light source and an optical fiber coupler made of a plurality of graded index multi-mode optical fibers. The mode of the input light signals can be converted to a random pattern mode through the mode scrambler, so that a steady excitation state of the input light can be realized, including not only dominant lower modes but also higher modes of the input light signals, resulting in enabling to divide the input light signals without any irregularity of the output light power.

10 Claims, 2 Drawing Sheets

---- LD EXCITATION

—— STEADY-STATE MODE

OPTICAL TRANSMISSION LINE FOR USE IN AN OPTICAL COMMUNICATION SYSTEM

BACKGROUND OF THE INVENTION

1. FIELD OF THE INVENTION

The present invention relates to an optical communication line or cable having optical fiber couplers for dividing light signals into a plurality of branches at a desirable split ratio used in an optical communication system or optical sensor system accommodating an optical fiber for example.

2. DESCRIPTION OF THE PRIOR ART

As an important component of an optical communication system or optical data link, there is provided an optical turnout or branch connection for dividing light signals transmitted from a light source to a plurality of optical fibers at a desired split ratio. There is used an optical fiber coupler in an optical communication system for coupling optical fibers as a kind of an optical branch connection. Such an optical fiber coupler is made in such a manner that, after a plurality of optical fibers are fused by melting in twist or in parallel, the fused optical fibers are heated to be melted by means of a heater such as an acetylene burner so that the melted optical fibers are extended under applying a constant tension, thereby obtaining an optical fiber coupler.

As a type of products of such an optical fiber coupler, there are two types such as so called a "2×2 type coupler" which is made of two optical fibers (see e.g., "Low-Loss access couple for multimode optical fiber division networks" reported by B.S. Kawasaki et al. in APPLIED OPTICS, Vol. 16, No. 7, in 1977 (page 1794 to 1795)) and so called a star type coupler which is made by coupling three or more fibers (see, e.g., "Quartz Taper Fiber Star Coupler" reported by Oshima in the Electronic Communication Society All Japan General Meeting No. 2299 in 1982).

In case the 2×2 type optical couplers are used as essential components of an optical communication subscriber's network, it is possible to divide a tree shaped optical communication network comprising optical fiber couplers 1 and subscribers 2 as shown in FIG. 1. In case the star couplers are used as essential components of a subscribers' network, it is possible to divide a star shaped optical communication network comprising optical fiber couplers 1 and subscribers 2 as shown in FIG. 2.

FIG. 3 shows a detailed structure of the optical fiber coupler 1 in the optical communication subscriber's network shown in FIG. 2, wherein the star coupler of 1×4 type is made in such a manner that, after graded index multi-mode fibers 1L, 2L, 3L and 4L are twisted together, the twisted fibers are heated to be melted and extended under applying a constant tension, whereby the star coupler of 1×4 type is made, having a taper portion 5 with its diameter reduced due to the extension thereof. When light signals are injected through an optical fiber 1F for example and guided to the taper portion 5, the input light signals are transferred and divided to the optical fibers 1L, 2L, 3L and 4L which are twisted and fused together.

In order to operate the subscriber's network having such an optical fiber coupler formed as described above in the same manner as is designed, it is necessary that the optical fiber coupler should satisfy the desired characteristics and, for example, in order to equally divide the input light signals to a plurality of output signals of the optical fiber coupler 1, the irregularity of the output power at each output port of the optical fiber coupler 1 must be reduced to be as small as possible. Moreover, the optical fiber coupler is so designed that the predetermined desired characteristics can be obtained when the optical fiber coupler is operated under a steady-state excitation of input light signals emitted by such as a light emitting diode (referred to as LED hereinafter), and then the input light power of the optical fiber coupler is equally divided to the optical fibers 1L, 2L, 3L and 4L twisted together in the taper portion 5 with power distribution as shown by a real line for example including higher modes of the output light signals being excited as shown by a real line in FIG. 3.

While, nowadays, it becomes possible to get a semiconductor laser (referred to as LD hereinafter) with high output power at a low cost equivalent to that of a LED, upon using a LD as a light source in an optical communication system, it is expected that the transmission distance can be extended and that the number of subscribers can be increased because of the high output power of LD.

However, since LD has an intense directivity of light projection with its main lobe projected, when the LD is coupled with the multi-mode fibers, only dominant lower modes of the input light power are excited in the optical fiber 1L for example as shown by dotted line in FIG. 3, and therefore, sufficient light power can not be divided to the other optical fibers 2L, 3L and 4L in the taper portion 5 of the optical fiber coupler, resulting in that there is a problem, being that there occurs irregularity of the output power among the respective output ports so that the desired characteristics of the optical fiber coupler can not be obtained when a LD is used as a light source.

SUMMARY OF THE INVENTION

An essential object of the present invention is to provide an optical communication circuit which is able to branch optical signals without irregularity of the output light power when the light signals are branched to optical communication fiber lines even though a semiconductor laser is used as a light source in the optical communication system.

In order to accomplish the object mentioned above, according to the present invention, there is provided a mode scrambler between a light source and an optical fiber coupler made of a plurality of graded index multi-mode optical fibers. Hereby, since the modes of the light are converted by the mode scrambler, there can be realized steady-state exciting condition of lights of not only lower modes but also higher modes, resulting in enabling to branch the light signals without any irregularity of the output light power.

The features of the present invention which are believed to be novel are set forth with particularity in the appended claims. The present invention, both as to its features and manner of operation together with further objects and advantages thereof, may best be understood with reference to the following detailed description, taken in conjunction with the accompanying drawings.

DETAILED DESCRIPTION OF THE PREFERRED EMBODIMENT

Figure 4:
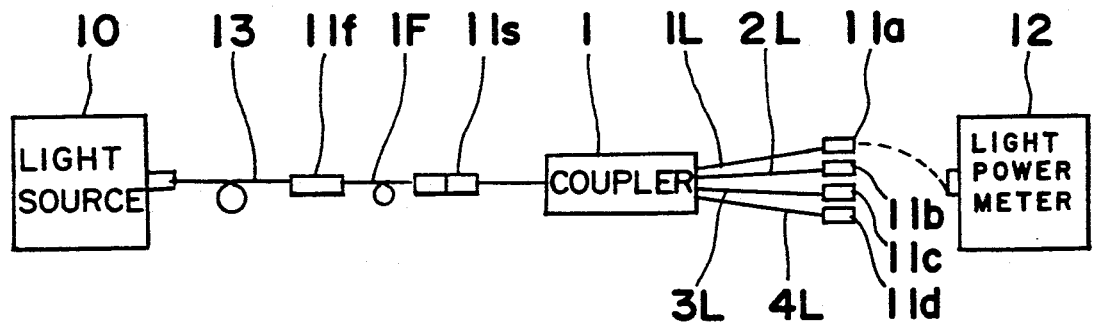
FIG. 4 is a schematic diagram showing an embodiment of an optical fiber coupler according to the present invention.

As shown in FIG. 4, a light source 10 made of a semiconductor laser is connected to a mode scrambler 13, which is in turn connected to an optical fiber coupler 1 of 1×4 division type through an optical multimode fiber 1F having a first and second FC connectors 11f and 11s. The star coupler 1 has four output terminals of optical fiber branches 1L to 4L which are respectively connected to a light power meter 12 through each of FC connectors 11a to 11d.

The mode scrambler 13 is arranged by applying side pressure to optical fibers or by inserting optical fibers of step type in a manner of graded type—step type—graded type (S excitation) or in a manner of step type—graded type—step type (SGS excitation). The mode scrambler 13 controls the exciting condition in the optical fibers (see "Design and Characteristics of SGS exciter for graded type fiber transmission band measurement" reported in Electronic Communication Society Article Vol. J65-B. No. 5 in May, 1982).

The mode scrambler 13 has functions of a steady-state mode excitation of light, so that even in the case that there is used a light source such as a semiconductor laser having an intense directivity of the output light power, the desired characteristics of the optical fiber couplers can be obtained. However, there is a difference that the mode conversion mentioned above can be performed more stably by using the SGS exciter than by using the S exciter.

Although the mode scrambler 13 may be provided in any portion between the light source 10 and the optical fiber coupler 1, in this embodiment, the mode scrambler 13 is connected to a portion immediately near the light source 10 in order to directly receive the light of the light source 10, it is facilitated to connect the multimode fiber 1F between the mode scrambler 13 and the optical fiber coupler 1, so that the mode conversion can be stably performed to obtain a steady-state mode excitation.

Although the mode scrambler 13 is arranged on the left side of the optical fiber coupler 1 as shown in FIG. 4, the mode scrambler 13 may be arranged on the right side of the optical fiber coupler 1 so that the input light signals are applied in the counter direction and also in this case, similar effect can be obtained, that is to say, also in a two-way communication system, there can be obtained a similar effect by changing the arrangement position of the mode scrambler.

Next, a result of experiments is explained for confirming the effect of using the mode scrambler mentioned above.

Figure 5:
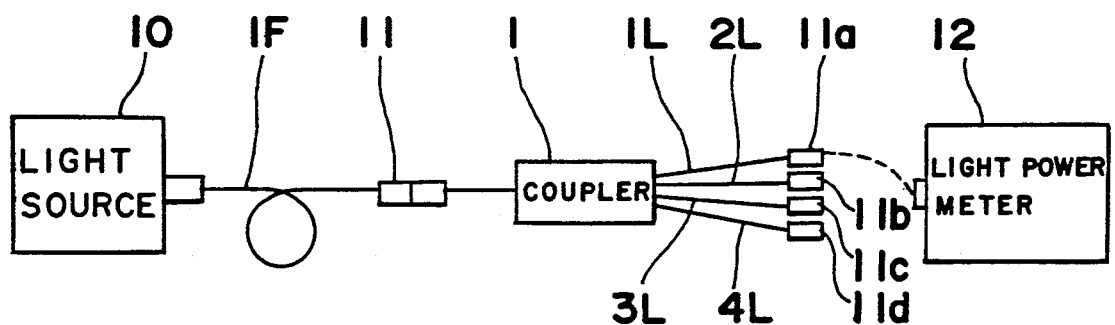
FIG. 5 is a schematic diagram showing an optical fiber coupler used in an experiment.

Experiments were conducted using a measurement system as shown in FIG. 5.

Referring to FIG. 5, reference numeral 10 denotes a light source, 11 denotes a FC connector and a star coupler 1 for 1×4 equally division is composed of graded index multimode fibers (referred to as GI fiber) with a core diameter of 50 μm and clad diameter of 125 μm. After the input light signals generated by the light source 10 are transmitted through the GI fiber 1F of generally two meters long with a core diameter of 50 μm, the input light signals are injected to the star coupler 1 through the FC connector 11, so that the output light signals of the star coupler 1 are introduced to a power meter 12 through the respective optical fibers 1L to 4L and through the FC connectors 11a, 11b, 11c and 11d.

[EXPERIMENT 1]

The experiment was first performed for measuring the irregularity of the output light power in the case of using LED as the light source 10. The wavelength of the light signals emitted from the light source 10 was around 1.3 μm and the output power of each ports are shown in the table 1. The numeric values in the table represent relative values against the light power at the input port, what we call insertion loss. [EXPERIMENT 2]

The same experiment was performed second for measuring the irregularity of the output light power in the case of using a semiconductor laser as the light source 10 with the same wavelength as in the experiment 1 and the results of the experiment 2 were also shown in the table 1.

TABLE 1

| OUTPUT | LIGHT SOURCE | | |
|---|---|---|---|
|  | LED (dB) | LD (dB) | LD + M.S. (dB) |
| 11a | −6.8 | −13.2 | −6.6 |
| 11b | −5.6 | −1.5 | −5.1 |
| 11c | −6.5 | −11.3 | −6.6 |
| 11d | −6.8 | −9.9 | −6.3 |
| MAX.-MIN. | 1.2 | 11.7 | 1.5 |

(M.S. denotes a mode scrambler.)

As shown in the table 1, when the LED is used as the light source 10, the difference between the maximum and output power among the output ports 11a to 11d is at most 1.2 dB. On the contrary, when the semiconductor laser is used as the light source 10, the difference between the maximum and minimum output power were extremely large, more than 10 dB.

[EXPERIMENT 3]

The same experiment as the experiments 1 and 2 was conducted except that the semiconductor laser was used as the light source and the mode scrambler of SGS code was interconnected between the light source and the optical fiber coupler as shown in FIG. 4. Herein, the SGS code is a mode scrambler having GI fiber with a core diameter of 50 μm held between the step index multi-mode fibers (SI fibers) with a core diameter of 50 μm, which has a character that a steady-state mode excitation of light can be stably obtained. In this case, the difference between the maximum and minimum output power is at most 1.5 dB, which is generally equal to the difference of the output power when the LED is used as the light source 10. In other words, the irregularity of the output power was remarkably reduced compared to that in the case of having no mode scrambler provided.

As described above, upon interconnecting the mode scrambler between an optical fiber coupler and a light source, even in the case of using a semiconductor laser as a light source having an intense directivity, there can be obtained a desired split ratio similar to that in the case of using a LED light source. Moreover, since the semiconductor laser has a high power, the optical branch connector with an optical fiber coupler according to the present invention is effective for use in an optical communication network with long distance and/or with many branches.

Figure 1:
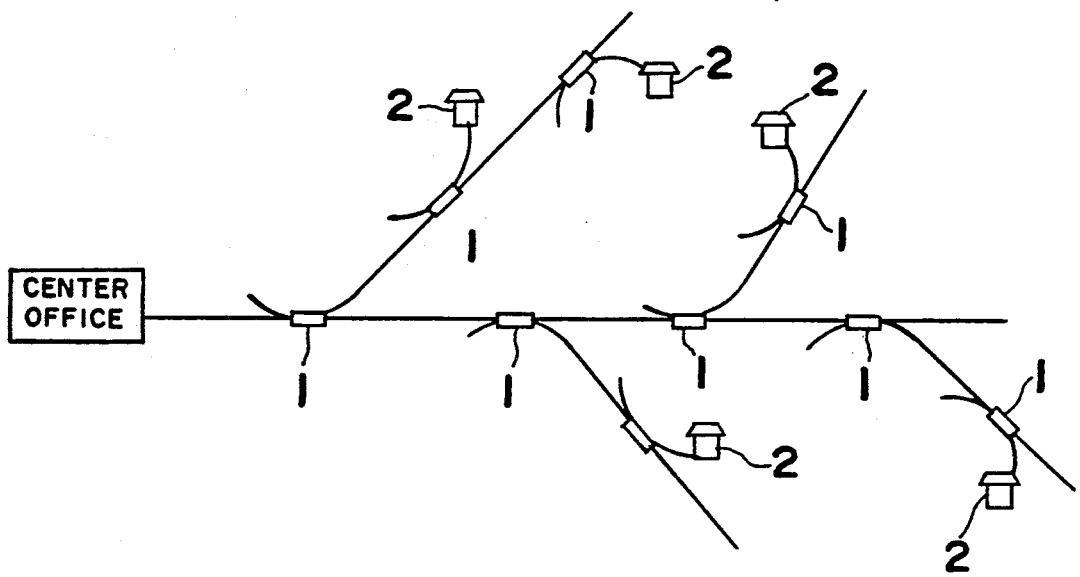
FIG. 1 is a schematic diagram showing a tree shaped network.
Figure 2:
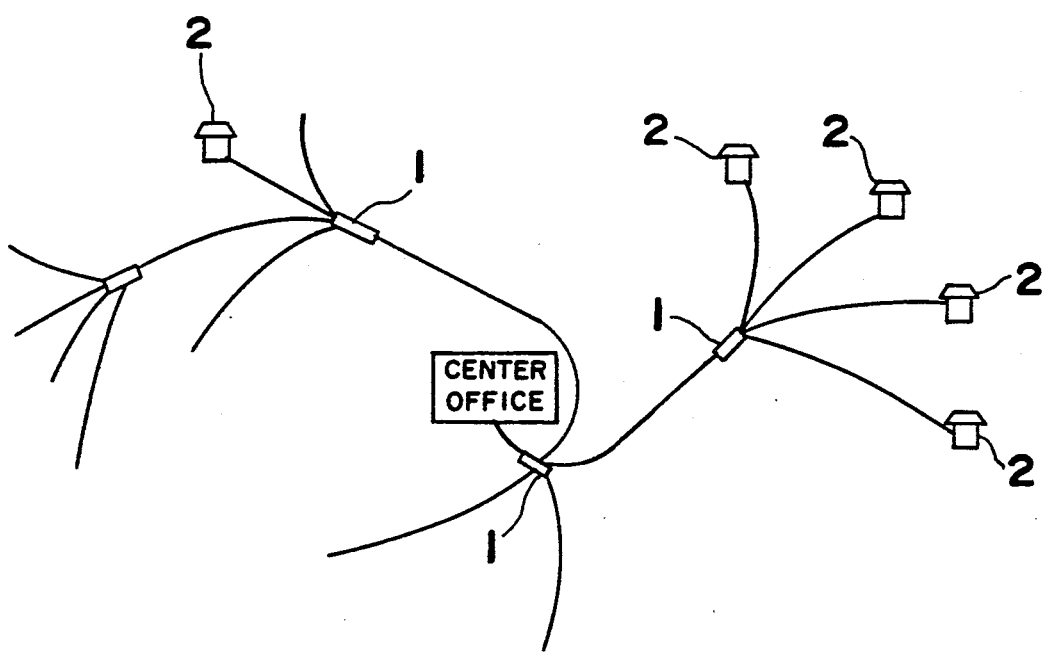
FIG. 2 is a schematic diagram showing a star shaped network.
Figure 3:
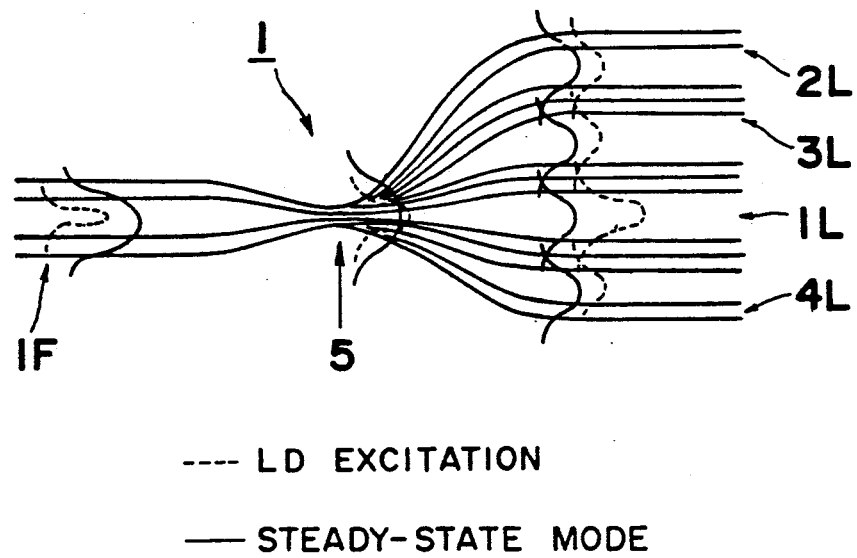
FIG. 3 is a schematic diagram showing an optical fiber coupler in a star shaped network.

In the optical communication systems shown in FIGS. 1 or 2, the nearest optical fiber coupler 1 may be replaced by the arrangement shown in FIG. 4 wherein the input port of the optical scrambler 13 is coupled to the upper stream optical fiber to receive the light signals from the center office and the branches 11a to 11d are coupled to the down stream optical fiber or fibers to send out the light signals to the subscribers, so that the communication system of tree shaped network or the star shaped network can be provided.

What is claimed is:

1. An optical communication circuit comprising:
   a light source for generating light signals,
   an optical fiber coupler, including at least one multi-mode optical fiber, having one light input port and a plurality of light output ports, each of said output ports outputting branched light, and
   mode scrambler means interconnected between said light source and said optical fiber coupler means, for converting the mode of the light signals generated by said light source into a random pattern mode of steady-state excitation including higher order modes, wherein said mode scrambler means is made of SGS code exciter having a graded index multi-mode fiber interposed between step index multi-mode fibers.

2. The optical communication circuit according to claim 1, wherein said light source is made of a semiconductor laser.

3. The optical communication circuit according to claim 1, wherein said optical fiber coupler means is made in such a manner that a plurality of graded index multi-mode optical fibers are bundled, heated and melted so that the melted optical fibers are extended with a tension applied to the optical fibers.

4. The optical communication circuit according to claim 1, wherein said mode scrambler is disposed directly to receive the light of said light source.

5. An optical communication circuit comprising:
   a light source for generating light signals,
   an optical fiber coupler, including at least one multi-mode optical fiber, having one light input port and a plurality of light output ports, each of said output ports outputting branched light, and
   mode scrambler means interconnected between said light source and said optical fiber coupler means, for converting the mode of the light signals generated by said light source into a random pattern mode of steady-state excitation including higher order modes, wherein said mode scrambler means is made of SGS code exciter having a graded index multi-mode fiber interposed between step index multi-mode fibers.

6. The optical communication circuit as claimed in claim 5, wherein said light source is made of a semiconductor laser.

7. The optical communication circuit as claimed in claim 5, wherein said optical fiber coupler is constructed in such a manner that a plurality of graded index multi-mode optical fibers are bundled, heated and melted so that the melted optical fibers extend and have a tension applied thereto.

8. The optical communication circuit as claimed in claim 5, wherein said mode scrambler means is disposed so as to directly receive light from the light source.

9. An optical communication system comprising:
   a center office for sending out light signals,
   a plurality of branching means for branching the light signals of said center office, and
   a plurality of receiving units for receiving the light signals sent from said branching means, and connected in a tree network or a star network,
   said branching means comprising:
      a light source for generating light signals,
      an optical fiber coupler, including at least one multi-mode optical fiber, having one light input port and a plurality of light output ports, each of said output ports outputting branched light, and
      mode scrambler means interconnected between said light source and said optical fiber coupler, for converting the mode of the light signals generated by said light source into a random pattern mode of steady-state excitation including higher order modes, wherein said mode scrambler means is made of SGS code exciter having a graded index multi-mode fiber interposed between step index multi-mode fibers.

10. A method for evenly dividing light signals into a plurality of branches, said method comprising the steps of:
   generating light signals;
   converting a mode of the light signals into a random pattern mode of steady-state excitation including higher order modes, wherein said converting step includes using a mode scrambler means made of SGS code exciter having a graded index multi-mode fiber interposed between step index multi-mode fibers;
   branching said light signals into at least one part;
   outputting branched light to at least one multi-mode optical fiber.

* * * * *